United States Patent
Lam et al.

(10) Patent No.: US 10,156,473 B2
(45) Date of Patent: Dec. 18, 2018

(54) REMOTE TARGET IDENTIFICATION USING LASER DOPPLER VIBROMETRY

(71) Applicant: The Boeing Company, Chicago, IL (US)

(72) Inventors: Tai A. Lam, Renton, WA (US); David C. Soreide, Seattle, WA (US); Jonathan M. Saint Clair, Seattle, WA (US)

(73) Assignee: The Boeing Company, Chicago, IL (US)

( * ) Notice: Subject to any disclaimer, the term of this patent is extended or adjusted under 35 U.S.C. 154(b) by 644 days.

(21) Appl. No.: 14/843,685

(22) Filed: Sep. 2, 2015

(65) Prior Publication Data

US 2017/0059392 A1 Mar. 2, 2017

(51) Int. Cl.
*G01P 3/36* (2006.01)
*G01H 9/00* (2006.01)
*G01H 13/00* (2006.01)
*G01S 17/58* (2006.01)
*G01S 7/48* (2006.01)
*G01S 7/481* (2006.01)

(52) U.S. Cl.
CPC .............. *G01H 9/00* (2013.01); *G01H 13/00* (2013.01); *G01P 3/36* (2013.01); *G01S 7/4802* (2013.01); *G01S 7/4812* (2013.01); *G01S 17/58* (2013.01)

(58) Field of Classification Search
CPC combination set(s) only.
See application file for complete search history.

(56) References Cited

U.S. PATENT DOCUMENTS

| | | | |
|---|---|---|---|
| 3,968,362 | A | 7/1976 | Mocker |
| 5,192,979 | A | 3/1993 | Grage et al. |
| 5,434,668 | A | 7/1995 | Wootton et al. |
| 6,728,645 | B1 | 4/2004 | Kozlov et al. |
| 7,477,398 | B2 | 1/2009 | Lal et al. |
| 7,554,670 | B2 | 6/2009 | Jann et al. |
| 7,719,663 | B2 | 5/2010 | Kawakatsu |

(Continued)

FOREIGN PATENT DOCUMENTS

| | | |
|---|---|---|
| CN | 103344947 A | 10/2013 |
| CN | 103499820 A | 1/2014 |
| CN | 103605124 A | 2/2014 |

OTHER PUBLICATIONS

Rodrigo et al., "Influence of laser frequency noise on scanning Fabry-Perot interferometer based laser Doppler velocimetry", Proc. SPIE, vol. 8992, Mar. 8, 2014.

(Continued)

*Primary Examiner* — Samantha K Abraham
(74) *Attorney, Agent, or Firm* — Ostrager Chong Flaherty & Broitman P.C.

(57) ABSTRACT

A laser Doppler vibrometer architecture and detection technique that can remotely identify targets based on their natural vibration frequencies using a scanning Fabry-Pérot interferometer. The proposed systems and methods can have stand-off distances longer than the coherence length of the laser by using spectroscopic detection methods instead of coherent heterodyne detection using a local oscillator. Pulsed lasers can be used which have high power output. In addition, by not using an acousto-optic modulator, the speed of the detectable target is not limited. Also the mixing efficiency of the return signal can be improved.

12 Claims, 4 Drawing Sheets

(56) References Cited

U.S. PATENT DOCUMENTS

2003/0189712 A1 10/2003 Pepper et al.
2010/0281986 A1 11/2010 Toal et al.

OTHER PUBLICATIONS

Rodrigo et al., "Monostatic coaxial 15 micron laser Doppler velocimeter using a scanning Fabry-Perot interferometer," Optics Express, vol. 21, No. 18, Sep. 3, 2013.
Extended European Search Report dated Jan. 17, 2017 from European Patent Application No. 16186868.2 (European counterpart of the instant patent application).

REMOTE TARGET IDENTIFICATION USING LASER DOPPLER VIBROMETRY

BACKGROUND

This disclosure generally relates to systems and methods for identifying a moving target at a remote location. In particular, this disclosure relates to measuring vibrations of a moving target for the purpose of target identification.

To track a moving target, radar devices typically detect the motion of the target based upon Doppler information provided by the radar signals that are reflected off the moving target. The movement of the target in a radial direction, relative to the radar device, causes the radar signals that reflect off the moving target to return to the radar device with a frequency that is different than the frequency that was transmitted by the radar device. Specifically, the radial movement of the target changes the frequency of the radar signal an amount that is proportional to the relative velocity of the target such that the change in frequency of the radar signal may be used to determine the location and speed of the moving target and to accordingly track the moving target.

A laser Doppler vibrometer (LDV) can be used to make non-contact vibration measurements of a surface. The laser beam from the LDV is directed at the surface of interest, and the vibration amplitude and frequency are extracted from the laser light reflected from the surface by detecting the Doppler shift due to the motion of that surface. The output of an LDV is generally a continuous analog voltage that is directly proportional to the target velocity component along the direction of the laser beam.

A typical vibrometer comprises a two-beam laser interferometer that measures the frequency (or phase) difference between an internal reference beam and a test beam. The test beam is directed at the target, and scattered light from the target is collected and interfered with the reference beam on a photodetector, typically a photodiode. Most commercial vibrometers work in a heterodyne regime by adding a known frequency shift (typically 30-40 MHz) to one of the beams. This frequency shift is usually generated by a Bragg cell, or an acousto-optic modulator. In vibrometers of this type, the beam from the laser, which has a frequency $f_o$, is divided into a reference beam and a test beam using a beamsplitter. The test beam then passes through the Bragg cell, which adds a frequency shift $f_b$. This frequency shifted beam is then directed toward the target. The motion of the target adds a Doppler shift to the beam given by $f_d=2*v(t)*\cos(\alpha)/\lambda$, where v(t) is the velocity of the target as a function of time, a is the angle between the laser beam and the velocity vector, and λ is the wavelength of the light. Light scatters from the target in all directions, but some portion of the light is collected by the LDV and reflected by the beamsplitter to the photodetector. This light has a frequency equal to $f_o+f_b+f_d$. This scattered light is combined with the reference beam at the photodetector. The initial frequency of the laser is very high (>$10^{14}$ Hz), which is higher than the response of the detector. The detector does respond, however, to the beat frequency between the two beams, which is at $f_b+f_d$ (typically in the tens of MHz range). The output of the photodetector is a standard frequency-modulated signal, with the Bragg cell frequency as the carrier frequency, and the Doppler shift as the modulation frequency. This signal can be demodulated to derive the velocity versus time of the vibrating target.

The LDV described in the previous paragraph has at least the following limitations:

(1) The acousto-optic modulator Bragg cell has a maximum modulation frequency of ~400 MHz, whereas a Mach 10 target has a Doppler shift of 4.4 GHz.

(2) The detection range is limited by the laser coherence length. Coherent heterodyne detection requires stand-off distances at less than half the laser coherence length.

(3) Mixing efficiency is low due to the complex optical train, namely beam splitters, which allow only part of the return signal to participate in the intermediate frequency mixing.

It would be desirable to provide an LDV for target identification which does not have the foregoing limitations.

SUMMARY

The subject matter disclosed in detail below is directed to an LDV architecture and detection technique that can remotely identify targets based on their natural vibration frequencies using a scanning (i.e., tunable) Fabry-Pérot interferometer. The proposed systems and methods can have stand-off distances longer than the coherence length of the laser by using spectroscopic detection methods instead of coherent heterodyne detection using a local oscillator. Pulsed lasers can be used which have high power output. In addition, by not using an acousto-optic modulator, the speed of the detectable target is not limited. Also the mixing efficiency of the return signal can be improved.

One aspect of the subject matter disclosed in detail below is a system comprising: a laser device; an optical circulator optically coupled to the laser device; a telescope optically coupled to the optical circulator; a tunable interferometer optically coupled to the optical circulator; a photodetector optically coupled to the tunable interferometer; and a signal processor electrically coupled to the photodetector. In accordance with the embodiments disclosed herein, the tunable interferometer is a scanning Fabry-Pérot interferometer comprising a plurality of piezoelectric transducers, and the signal processor is electrically coupled to the piezoelectric transducers. The signal processor may be configured to supply scanning voltages to the piezoelectric transducers which have the effect of adjusting a wavelength of the tunable interferometer so that the wavelength varies within a range of wavelengths that includes a wavelengths of light emitted by the laser device and a wavelength of light which was first emitted by the laser device and then Doppler shifted by a target.

In accordance with at least some embodiments, the signal processor may be further configured to perform the following operations: (a) monitoring a detection voltage produced by the photodetector as a function of the scanning voltage supplied to the piezoelectric transducers; (b) identifying scanning voltages where peak detection voltages occur; (c) comparing differences in scanning voltages where the peaks occur to reference voltages in a calibration table to determine the relative speed of the target as well as the resonant vibration frequency of the target; and (d) identifying a target based on the resonant vibration frequency determined in operation (c).

In accordance with at least some embodiments, the optical circulator is configured to pass a first portion of light emitted by the laser device to the telescope, a second portion of light emitted by the laser device to the tunable interferometer, and light from the telescope to the tunable interferometer.

Another aspect of the subject matter disclosed in detail below is a system comprising: a laser device; an optical circulator optically coupled to the laser device; a telescope optically coupled to the optical circulator; a scanning Fabry- Pérot interferometer optically coupled to the optical circulator, the scanning Fabry-Pérot interferometer comprising a plurality of piezoelectric transducers; a photodetector optically coupled to the scanning Fabry-Pérot interferometer; and a signal processor electrically coupled to the photodetector and to the piezoelectric transducers, wherein the optical circulator is configured to pass a first portion of light emitted by the laser device to the telescope, a second portion of light emitted by the laser device to the scanning Fabry-Pérot interferometer, and light from the telescope to the scanning Fabry-Pérot interferometer.

A further aspect of the disclosed subject matter is a method comprising: directing laser light into an optical circulator; sending respective portions of the laser light to a telescope and to an interferometer; directing the laser light received from the optical circulator by the telescope toward a target; recapturing laser light reflected from the target using the telescope; and sending recaptured laser light from the telescope to the interferometer via the optical circulator. This method may further comprise: supplying scanning voltages to piezoelectric transducers of the interferometer; photodetecting recaptured laser light that passes through the interferometer; monitoring detection voltage as a function of the scanning voltages; identifying scanning voltages where peak detection voltages occur; and comparing differences in scanning voltages where peaks occur to data in a calibration table to determine relative speed and/or resonant vibration frequency of the target. The method may further comprise identifying the target based on the determined resonant vibration frequency.

The systems and methods disclosed herein can be used in surveillance of remote targets. The surveillance can be from ground-based, airborne, or space-based platforms. The system could be directed at military, industrial (including hazardous environments), urban, commercial, and other targets of opportunity.

Other aspects of systems and methods which use laser Doppler vibrometry to identify remote targets based on their natural vibration frequencies are disclosed below.

BRIEF DESCRIPTION OF THE DRAWINGS

Reference will hereinafter be made to the drawings in which similar elements in different drawings bear the same reference numerals.

DETAILED DESCRIPTION

Illustrative embodiments of a laser Doppler vibrometer suitable for tracking and identifying a remote target will be described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
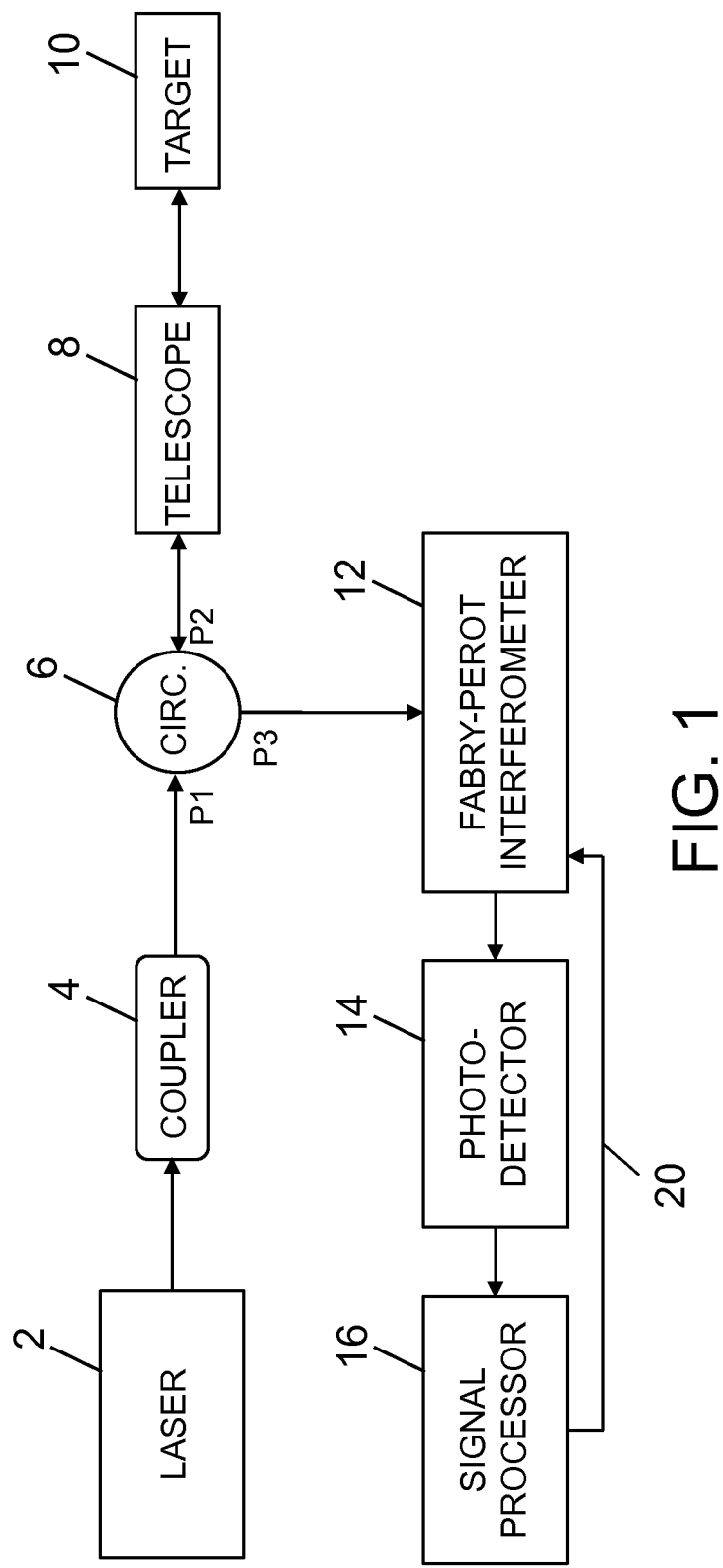
FIG. 1 is a block diagram identifying some components of and showing an architecture of a laser Doppler vibrometer in accordance with one embodiment.

FIG. 1 is a block diagram identifying some components of and showing an architecture of a laser Doppler vibrometer in accordance with one embodiment. The system depicted in FIG. 1 comprises: a laser device 2; an optical circulator 6 having a Port P1 optically coupled to the laser device 2 by means of an optical coupler 4; a telescope 8 optically coupled to a Port P2 of the optical circulator 6; a scanning (i.e., tunable) Fabry-Pérot interferometer 12 optically coupled to a Port P3 of the optical circulator 6; a photodetector 14 (e.g., a photodiode) optically coupled to the Fabry-Pérot interferometer 12; and a signal processor 16 electrically coupled to the photodetector 14. The telescope can be used to direct laser light toward a target 10 and then recapture returning laser light reflected or scattered by target 10. That recaptured laser light enters Port P2 and then exits Port P3 of the optical circulator 6. The laser light exiting Port P3 of the optical circulator 6 enters the Fabry-Pérot interferometer 12. In addition, some of the laser light emitted by the laser source 2 is directed by the optical circulator 6 to the Fabry-Pérot interferometer 12.

Figure 2:
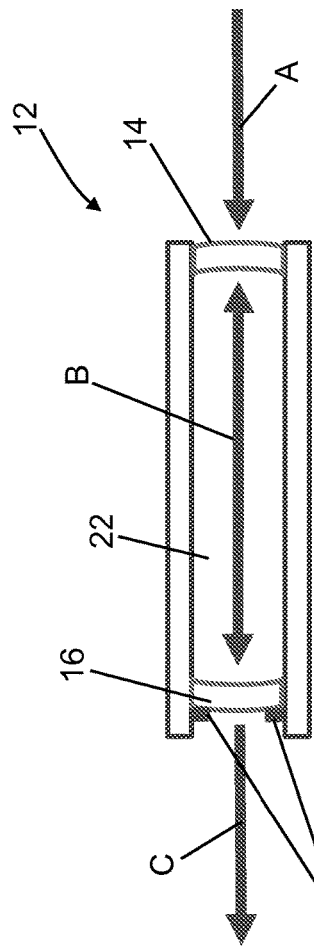
FIG. 2 is a diagram representing a conceptual view of a scanning Fabry-Pérot interferometer in accordance with one embodiment.

As depicted in FIG. 2, the Fabry-Pérot interferometer 12 typically comprises an optically transparent medium (e.g., air or optical fiber) in a cavity 22 partly defined by two parallel highly reflecting mirrors 14 and 16. In accordance with one embodiment, a length of single-mode optical fiber, placed in the cavity 22, may extend between the mirrors 14 and 16. The mirrors 14 and 16 are configured so that some incident light is reflected and some incident light is transmitted. The arrow A in FIG. 2 represents laser light from the optical circulator 6 (see FIG. 1) which is impinging on the mirror 14 (the portion of that incident light which is reflected by mirror 14 is not indicated in FIG. 2). The double-headed arrow B in FIG. 2 represents internally reflected laser light inside the cavity 22. The arrow C in FIG. 2 represents laser light transmitted by the Fabry-Pérot interferometer 12 to the photodetector 14.

The transmission spectrum of the Fabry-Pérot interferometer 12 as a function of wavelength exhibits peaks of large transmission corresponding to resonances of the interferometer. The transmission function of the Fabry-Pérot interferometer 12 is caused by interference between the multiple reflections of light between the two reflecting mirrors 12 and 14. Constructive interference occurs if the transmitted beams are in phase, and this corresponds to a high-transmission peak of the interferometer. If the transmitted beams are out-of-phase, destructive interference occurs and this corresponds to a transmission minimum. Maximum transmission occurs when the optical path length difference between each transmitted beam is an integer multiple of the wavelength. The wavelength separation between adjacent transmission peaks is called the free spectral range of the interferometer. The Fabry-Pérot interferometer 12 passes wavelengths that are equal to integer fractions of the cavity length; all other wavelengths are attenuated.

Still referring to FIG. 2, the Fabry-Pérot interferometer 12 further comprises a plurality of piezoelectric transducers 18, which can be employed to change the length of the cavity 22 between mirrors 14 and 16, and thereby tune the wavelength of the Fabry-Pérot interferometer 12 so that it acts as a filter. The lengths of the piezoelectric transducers 18 are typically changed by application of a positive variable voltage to the piezoelectric transducers 18. Thus the distance between the mirrors 14 and 16 can be tuned in order to change the wavelengths which will be passed by the scanning Fabry-Pérot interferometer 12.

Figure 3:
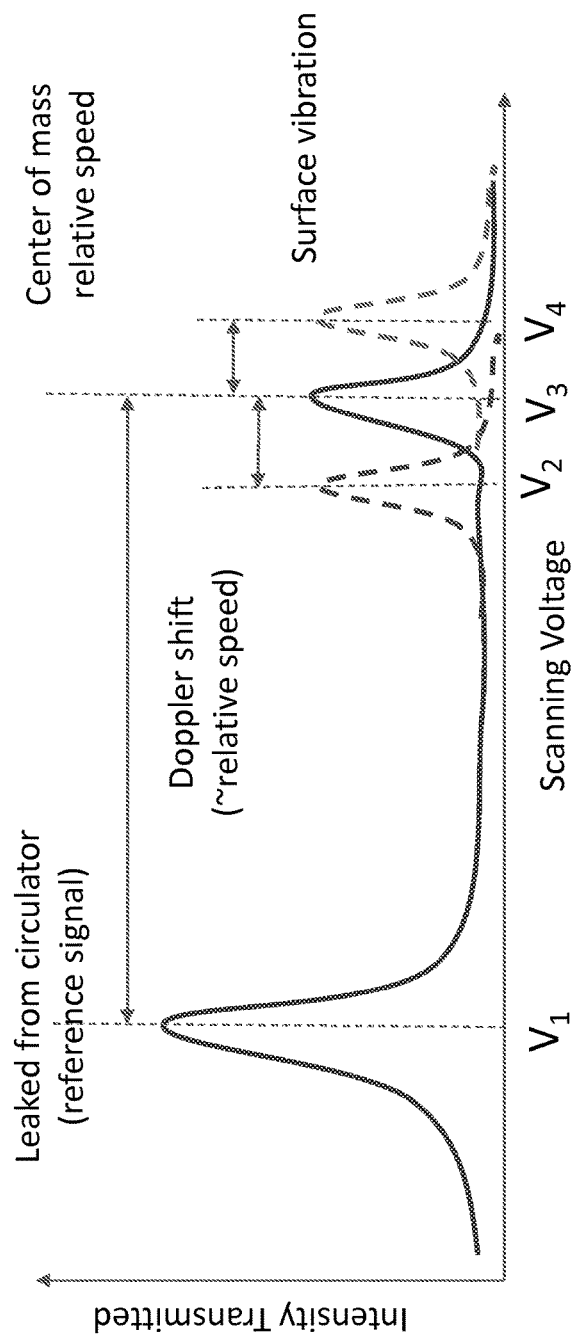
FIG. 3 is a graph showing the scanning voltage produced by the photodetector in dependence on the intensity of light passed through the scanning Fabry-Pérot interferometer depicted in FIG. 1.

In the embodiment depicted in FIG. 1, the scanning Fabry-Pérot interferometer 12 is controlled to have a pass band which corresponds to the wavelengths that are used in the measurement. More specifically, the distance between the mirrors 14 and 16 is controlled by the signal processor 16, which supplies varying scanning voltages to the piezoelectric transducers 18 via a voltage supply line 20. In this manner the Fabry-Pérot interferometer 12 is controlled to scan its pass band through a required wavelength range, such as the wavelength range depicted in FIG. 3, FIG. 3 is a graph showing the detection voltages (vertical axis) produced by the photodetector 14 in dependence on the intensity of laser light passed through the Fabry-Pérot interferometer 12 as the scanning voltage (horizontal axis) is varied. In the example, depicted in FIG. 3, the laser light leaked to the Fabry-Pérot interferometer 12 from the laser source 2 by the optical circulator 6 produces a transmission peak centered at scanning voltage $V_1$. This transmission peak at scanning voltage $V_1$ is treated as the reference signal by the signal processor 16. The rest of the laser light from laser source 2 is passed by the optical circulator 6 to the telescope 8, which directs the resulting laser beam toward the target 10. The laser light returned to the telescope 8 from the target 10 is then passed via the optical circulator 6 to the Fabry-Pérot interferometer 12, which scans the incoming laser light as the cavity length is being changed. In the example depicted in FIG. 3, the resulting output from the Fabry-Pérot interferometer 12 causes the photodetector 14 to produce transmission peaks at scanning voltages $V_2$, $V_3$, and $V_4$. The difference between the scanning voltages $V_1$ and $V_3$ is a measure of the Doppler shift produced by the velocity component of the center of mass of the target 10 along the line of sight of the telescope 8, whereas the transmission peaks (indicated by dashed lines in FIG. 3) centered at scanning voltages $V_2$ and $V_4$ are caused by surface vibrations of the target 10.

The scanning speed is controlled by the signal processor 16 in such a way that during the scan, a predetermined total amount of transmitted light is received after the Fabry-Pérot interferometer 12 at each wavelength of radiation. By programming suitable scanning rate functions, it is possible to provide target specific spectral measurements for several properties of the target.

Figure 4:
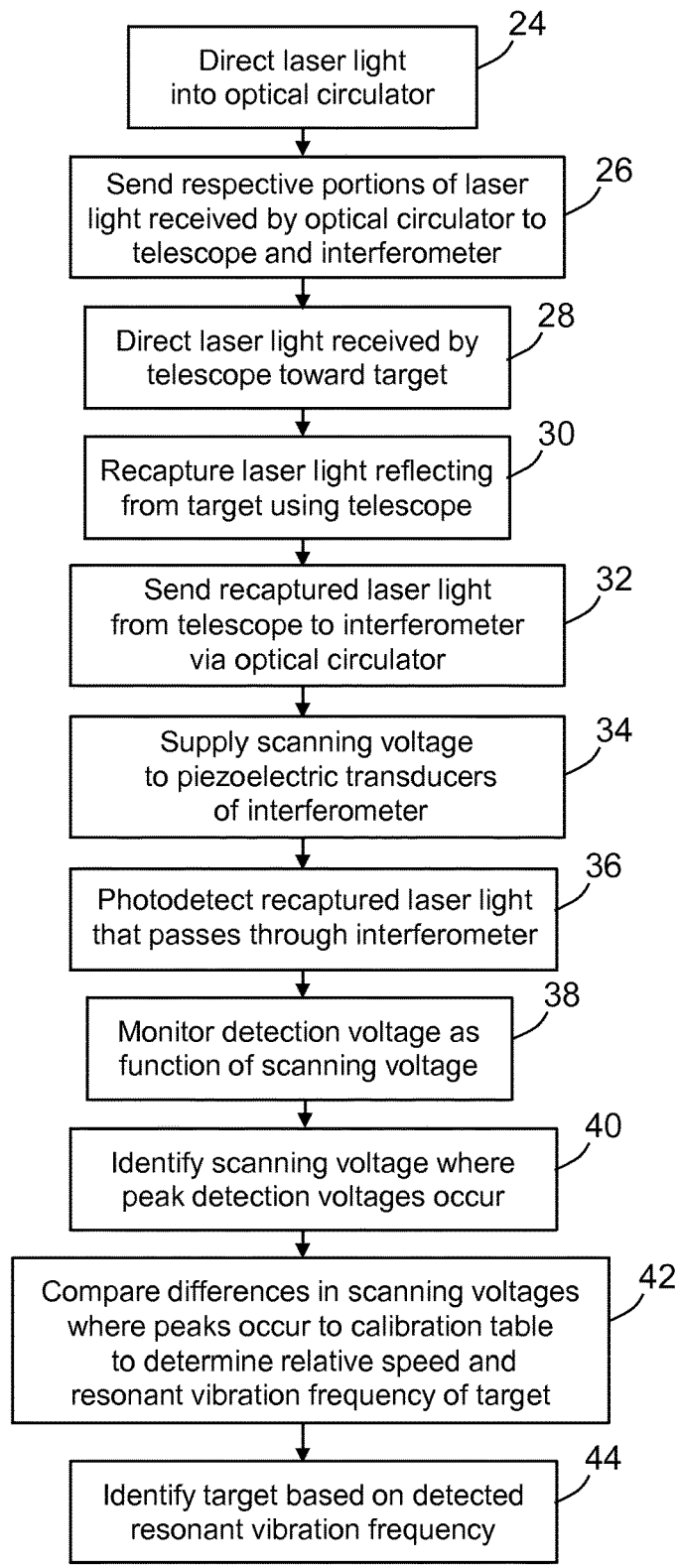
FIG. 4 is a flowchart identifying steps of a method for identifying a remote target using a tunable interferometer in accordance with one embodiment.

FIG. 4 is a flowchart identifying steps of a method for identifying a remote target using a tunable interferometer in accordance with one embodiment. The operation of the laser Doppler vibrometer starts with a monochromatic, low noise, high spectral purity laser. The laser light emitted by laser source 2 is directed toward and propagates into Port P1 of the optical circulator (step 24). Some of the laser light entering the optical circulator via Port P1 exits Port P2 and is sent to the telescope 8; other laser light is leaked via Port P3 to the Fabry-Pérot interferometer 12 (step 26). The propagation could be in optical fiber or air/vacuum. The leakage light from Port P1 to Port P3 is used as the reference signal by the signal processor 16. Light exiting Port P2 is coupled into the telescope and propagates to the target (step 28). Laser light reflecting from the target is Doppler shifted and re-captured by the telescope (step 30). The recaptured laser light enters Port P2 and exits through Port P3 of the optical circulator 6 and is sent to the Fabry-Pérot interferometer 12 (step 32).

The Fabry-Pérot interferometer 12 is tuned by applying a voltage (scanning voltage) to the piezoelectric transducers (step 34). The scanning voltage changes the length of the piezoelectric transducers, hence changing the distance between the two mirrors 14 and 16 inside the Fabry-Pérot interferometer 12. The distance between the two mirrors determines the wavelength of light that gets through. Any laser light that is not filtered out by the Fabry-Pérot interferometer 12 is detected by the photodetector 14 (e.g., a photodiode), which converts the light intensity into a voltage (detection voltage) (step 36).

The signal processor 16 monitors the detection voltage as a function of the scanning voltage (step 38). It identifies the scanning voltages where the peak detection voltages occur (step 40). The differences in scanning voltages where the peaks occur are then compared to a calibration table to determine the relative speed of the target as well as the resonant vibration frequency of the target (step 42). Based on the detected resonant frequency the target can be identified (step 44).

Figure 5:
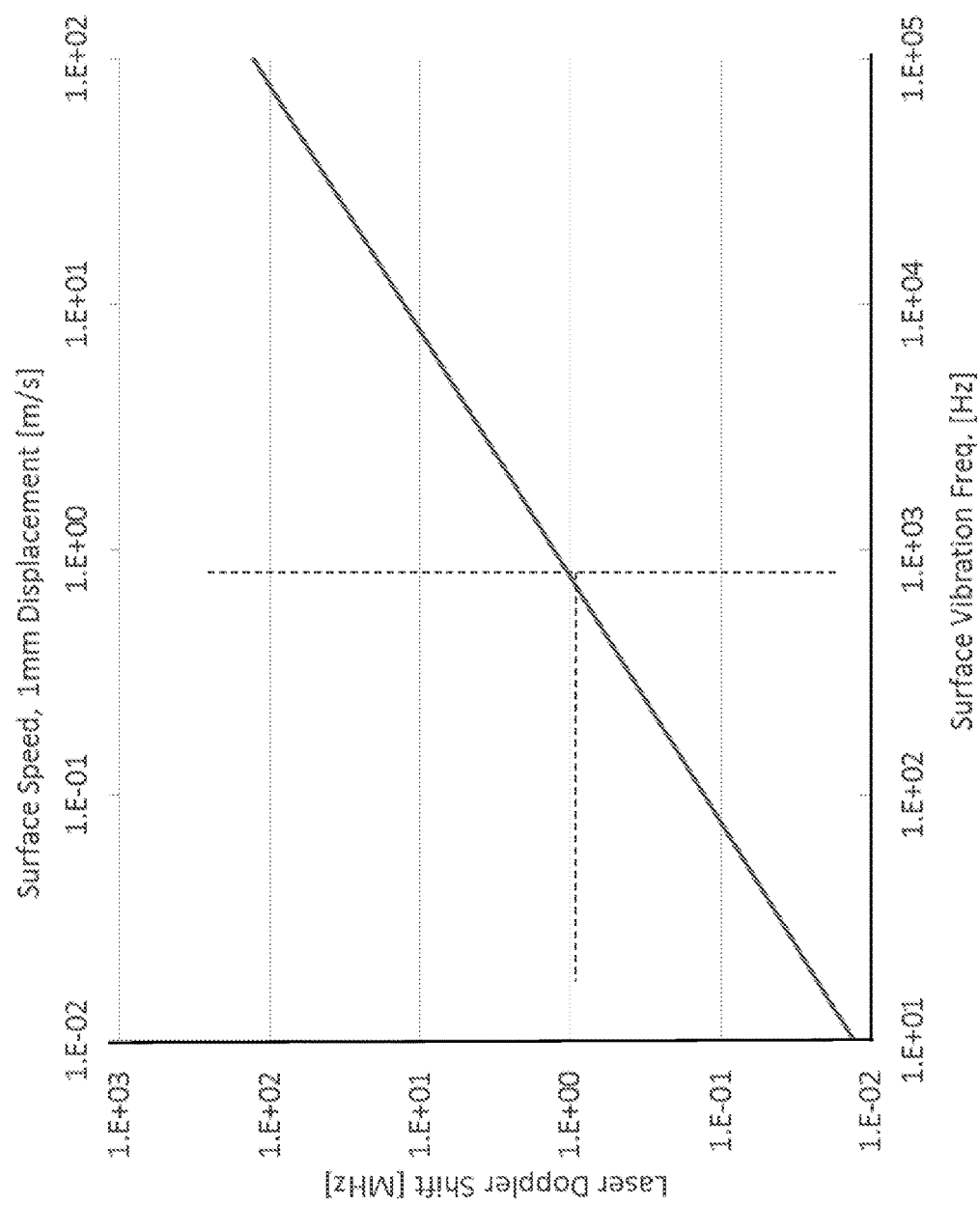
FIG. 5 is a graph showing the laser Doppler shift (in MHz) as a function of the surface vibration frequency (Hz) and the associated surface speed (m/s).

FIG. 5 is a graph showing the laser Doppler shift (in MHz) as a function of the surface vibration frequency (Hz) and the associated surface speed (m/s). Assuming for the sake of illustration that the system detects a surface vibration on a target having a vibration frequency of 1 kHz and a peak displacement of 1 mm, the resulting peak surface speed will be 1 m/s, as indicated by the vertical dashed line in FIG. 5. A surface speed of 1 m/s would produce a Doppler shift of approximately 1 MHz, as indicated by the horizontal dashed line in FIG. 5. A properly designed scanning Fabry-Pérot interferometer can easily detect this 1-MHz shift.

The system disclosed above can be used at distances of tens or hundreds of kilometers to identify and differentiate targets based on their natural vibration frequencies. Recent advances in laser power output and spectral purity could enable new applications. For example, a commercially available fiber laser at 1.55-μm, 10-W continuous wave output, and spectral width<1 kHz provides a coherence length of at least 100 km. Using the laser radar equation (10-cm aperture), one can calculate that a 50-km distance separation (100-km round trip) would result in a shot noise limited signal-to-noise ratio (SNR) of ~300× or 25 dB. This is better than the 20-dB SNR typically required for standard optical signal processing methods. Lasers with <1-Hz spectral widths exist.

One proposed application of this technology is to detect decoy warheads on intercontinental ballistic missiles (ICBM). The detection modality assumption is that the actual warheads have different masses from the decoy ones, hence different natural vibration frequencies. The excitation energy comes from the rocket engines or aerodynamic forces coupling during re-entry. The biggest challenge is that at Mach 10, a 50-km standoff gives the defender only 15 seconds to track, identify, and target.

Another proposed application is to use laser Doppler vibrometry for persistent surveillance from ground-based, airborne, or space-based platforms. The system could be directed at military and industrial targets of opportunities. For example, the vibration frequency of a missile silo lid could be monitored to determine if it is occupied. For distances larger than the coherence length, spectroscopic detection techniques such as Fabry-Pérot and laser comb spectroscopy are required. Atmospheric turbulence could be corrected using adaptive optics, or alternatively considered as part of the random noise floor in the signal processing of long duration data.

While systems and methods that use laser Doppler vibrometers to track and identify remote targets have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The method claims set forth hereinafter should not be construed to require that the steps recited therein be performed in alphabetical order or in the order in which they are recited. Nor should they be construed to exclude any portions of two or more steps being performed concurrently or alternatingly.

The invention claimed is:

1. A system comprising:
   a laser device;
   an optical circulator optically coupled to said laser device;
   a telescope optically coupled to said optical circulator;
   a tunable interferometer optically coupled to said optical circulator;
   a photodetector optically coupled to said tunable interferometer; and
   a signal processor electrically coupled to said photodetector,
   wherein said tunable interferometer is a scanning Fabry-Perot interferometer comprising a plurality of piezoelectric transducers, and said signal processor is electrically coupled to said piezoelectric transducers; and
   wherein said signal processor is configured to perform the following operations:
   (a) supplying scanning voltages to said piezoelectric transducers which have the effect of adjusting a wavelength of said tunable interferometer so that the wavelength varies within a range of wavelengths that includes a wavelength wavelengths of light emitted by said laser device and a wavelength of light which was first emitted by said laser device and then Doppler shifted by a target;
   (b) monitoring a detection voltage produced by said photodetector as a function of the scanning voltage supplied to said piezoelectric transducers;
   (c) identifying scanning voltages where peak detection voltages occur;
   (d) comparing differences in scanning voltages where the peaks occur to reference voltages in a calibration table to determine the relative speed of the target as well as the resonant vibration frequency of the target; and
   (e) identifying a target based on the resonant vibration frequency determined in operation (d).

2. The system as recited in claim 1, wherein said tunable interferometer is configured to detect Doppler shifts within a range that includes 1 MHz.

3. The system as recited in claim 1, wherein said optical circulator is configured to pass a first portion of light emitted by said laser device to said telescope and a second portion of light emitted by said laser device to said tunable interferometer.

4. The system as recited in claim 3, wherein said optical circulator is further configured to pass light from said telescope to said tunable interferometer.

5. The system as recited in claim 1, wherein said optical circulator is configured to pass a first portion of light emitted by said laser device to said telescope and to pass light from said telescope to said tunable interferometer.

6. The system as recited in claim 5, wherein said optical circulator is further configured to pass a second portion of light emitted by said laser device to said tunable interferometer.

7. The system as recited in claim 1, further comprising a ground-based platform that supports at least said laser device, said optical circulator, said telescope, said tunable interferometer, and said photodetector.

8. The system as recited in claim 1, further comprising an airborne platform that supports at least said laser device, said optical circulator, said telescope, said tunable interferometer, and said photodetector.

9. The system as recited in claim 1, further comprising a space-based platform that supports at least said laser device, said optical circulator, said telescope, said tunable interferometer, and said photodetector.

10. A system comprising:
    a laser device;
    an optical circulator optically coupled to said laser device;
    a telescope optically coupled to said optical circulator;
    a scanning Fabry-Perot interferometer optically coupled to said optical circulator, said scanning Fabry-Perot interferometer comprising a plurality of piezoelectric transducers;
    a photodetector optically coupled to said scanning Fabry-Perot interferometer; and
    a signal processor electrically coupled to said photodetector and to said piezoelectric transducers,
    wherein said optical circulator is configured to pass a first portion of light emitted by said laser device to said telescope, a second portion of light emitted by said laser device to said scanning Fabry-Perot interferometer, and light from said telescope to said scanning Fabry-Perot interferometer, and
    wherein said signal processor is configured to perform the following operations:
    (a) supplying scanning voltages to said piezoelectric transducers which have the effect of adjusting a wavelength of said scanning Fabry-Perot interferometer so that the wavelength varies within a range of wavelengths that includes a wavelengths of light emitted by said laser device and a wavelength of light which was first emitted by said laser device and then Doppler shifted by a target;
    (b) monitoring a detection voltage produced by said photodetector as a function of the scanning voltage supplied to said piezoelectric transducers;
    (c) identifying scanning voltages where peak detection voltages occur;
    (d) comparing differences in scanning voltages where the peaks occur to reference voltages in a calibration table to determine the relative speed of the target as well as the resonant vibration frequency of the target; and
    (e) identifying a target based on the resonant vibration frequency determined in operation (d).

11. A method comprising:
    directing laser light into an optical circulator;
    sending respective portions of said laser light to a telescope and to an interferometer;

directing the laser light received from the optical circulator by the telescope toward a target;

recapturing laser light reflected from the target using the telescope;

sending recaptured laser light from the telescope to the interferometer via the optical circulator;

supplying scanning voltages to piezoelectric transducers of the interferometer;

photodetecting recaptured laser light that passes through the interferometer;

monitoring detection voltage as a function of the scanning voltages;

identifying scanning voltages where peak detection voltages occur;

comparing differences in scanning voltages where peaks occur to data in a calibration table to determine a resonant vibration frequency of the target; and identifying the target based on the determined resonant vibration frequency.

12. The method as recited in claim 11, further comprising:

comparing differences in scanning voltages where peaks occur to data in a calibration table to determine a relative speed of the target.

* * * * *